United States Patent
Kosaka et al.

(10) Patent No.: US 9,657,380 B2
(45) Date of Patent: May 23, 2017

(54) HIGH STRENGTH HOT-ROLLED STEEL SHEET HAVING EXCELLENT DUCTILITY, STRETCH FLANGEABILITY AND UNIFORMITY AND METHOD OF MANUFACTURING THE SAME

(75) Inventors: Noriaki Kosaka, Fukuyama (JP); Kazuhiro Seto, Chiba (JP); Hidetaka Kawabe, Kawasaki (JP)

(73) Assignee: JFE Steel Corporation (JP)

( * ) Notice: Subject to any disclaimer, the term of this patent is extended or adjusted under 35 U.S.C. 154(b) by 261 days.

(21) Appl. No.: 14/395,929

(22) PCT Filed: Apr. 26, 2012

(86) PCT No.: PCT/JP2012/061700
§ 371 (c)(1),
(2), (4) Date: Oct. 21, 2014

(87) PCT Pub. No.: WO2013/161090
PCT Pub. Date: Oct. 31, 2013

(65) Prior Publication Data
US 2015/0101717 A1    Apr. 16, 2015

(51) Int. Cl.
| | | |
|---|---|---|
| C22C 38/14 | (2006.01) |
| C22C 38/04 | (2006.01) |
| C22C 38/06 | (2006.01) |
| C22C 38/02 | (2006.01) |
| C21D 8/02 | (2006.01) |
| C21D 8/04 | (2006.01) |
| C22C 38/00 | (2006.01) |
| C21D 9/46 | (2006.01) |

(52) U.S. Cl.
CPC ............ C22C 38/14 (2013.01); C21D 8/0426 (2013.01); C21D 8/0463 (2013.01); C22C 38/001 (2013.01); C22C 38/02 (2013.01); C22C 38/04 (2013.01); C22C 38/06 (2013.01); *C21D 8/0263* (2013.01); *C21D 9/46* (2013.01); *C21D 2211/004* (2013.01); *C21D 2211/005* (2013.01)

(58) Field of Classification Search
None
See application file for complete search history.

(56) References Cited

U.S. PATENT DOCUMENTS

| 8,535,458 B2 | 9/2013 | Kohsaka et al. |
|---|---|---|
| 2010/0319819 A1 | 12/2010 | Kaneko et al. |
| 2013/0087252 A1* | 4/2013 | Ariga .................... C22C 38/02 |
| | | 148/507 |

FOREIGN PATENT DOCUMENTS

| EP | 1 170 390 | 1/2002 | |
|---|---|---|---|
| EP | 1 577 412 | 9/2005 | |
| EP | 2 014 781 | 1/2009 | |
| EP | 2 177 640 | 4/2010 | |
| EP | 2243853 A1 * | 10/2010 | ............. C22C 38/14 |
| EP | 2 586 885 | 5/2013 | |
| JP | 2000-273577 | 10/2000 | |
| JP | 2002-322541 | 11/2002 | |
| JP | 2007-9322 | 1/2007 | |
| JP | 2007-302992 | 11/2007 | |
| JP | 2009-185361 | 8/2009 | |
| KR | 10-2008-0110904 | 12/2008 | |
| WO | 2009/099237 | 8/2009 | |
| WO | 2010/131761 | 11/2010 | |
| WO | 2011/162412 | 12/2011 | |
| WO | 2011/162418 | 12/2011 | |

OTHER PUBLICATIONS

Supplementary European Search Report dated Jan. 26, 2016 of corresponding European Application No. 12875169.0.
Korean Notice of Allowance dated Nov. 24, 2016, from a corresponding Korean Application.

* cited by examiner

*Primary Examiner* — Deborah Yee
(74) *Attorney, Agent, or Firm* — DLA Piper LLP (US)

(57) ABSTRACT

A slab has a steel composition including 0.020% to 0.065% of C, 0.1% or less of Si, 0.40% to less than 0.80% of Mn, 0.030% or less of P, 0.005% or less of S, 0.08% to 0.16% of Ti, 0.005% to 0.1% of Al, 0.005% or less of N, and the balance being Fe and incidental impurities, in which Ti* (=Ti−(48/14)×N) satisfies [Ti*≥0.08] and [0.300≤C/Ti*≤0.375], is subjected to hot rolling to obtain a hot-rolled steel sheet in which the steel microstructure includes, in terms of area fraction, 95% or more of a ferrite phase; the average ferrite grain size is 10 μm or less; the average grain size of Ti carbides precipitated in steel is 10 nm or less; and Ti in the amount of 80% or more of Ti* is precipitated as Ti carbides.

2 Claims, No Drawings

HIGH STRENGTH HOT-ROLLED STEEL SHEET HAVING EXCELLENT DUCTILITY, STRETCH FLANGEABILITY AND UNIFORMITY AND METHOD OF MANUFACTURING THE SAME

TECHNICAL FIELD

This disclosure relates to a high strength hot-rolled steel sheet useful for frame components for large-sized vehicles and automobiles such as frames for trucks.

BACKGROUND

In recent years, from the viewpoint of global environmental protection, to control $CO_2$ emissions, there has been an urgent need to improve the fuel efficiency of automobiles and there has been a demand for weight reduction by reducing the thickness of materials to be used. However, such a reduction in thickness degrades crashworthiness. Since there has also been a requirement to improve safety to ensure the safety of occupants at the time of a vehicular collision, it is essential to increase the strength of materials to be used to achieve reduction in thickness.

Many automobile components for which a steel sheet is used as a material are manufactured by press forming. In general, by increasing the strength of a steel sheet, ductility, stretch flangeability, and the like are degraded and springback is increased. Therefore, formability and shape stability remain problems to be solved. In recent years, it has become possible to predict the amount of springback with high accuracy by CAE (Computer Assisted Engineering). When there is a large variation in material quality, the accuracy of prediction by CAE deteriorates. Therefore, there has been a demand for a high strength steel sheet having, in addition to formability, excellent uniformity of material in which the variation in strength is small.

Currently, development has been actively conducted to achieve both high strength and good formability. For example, Japanese Unexamined Patent Application Publication No. 2007-9322 discloses a high strength hot-rolled steel sheet having excellent ductility, stretch flangeability, and tensile fatigue with a TS of 780 MPa or more, which has a chemical composition including, in percent by mass, 0.06% to 0.15% of C, 1.2% or less of Si, 0.5% to 1.6% of Mn, 0.04% or less of P, 0.005% or less of S, 0.05% or less of Al, 0.03% to 0.20% of Ti, and the balance being Fe and incidental impurities, which has a microstructure including 50% to 90% of a ferrite phase, in terms of volume fraction, and the balance being substantially a bainite phase, the total volume fraction of the ferrite phase and the bainite phase being 95% or more, in which precipitates containing Ti are precipitated in the ferrite phase, and the average diameter of the precipitates is 20 nm or less, and in which 80% or more of the Ti content in the steel is precipitated.

Furthermore, Japanese Unexamined Patent Application Publication No. 2007-302992 discloses a high strength hot-rolled steel sheet having excellent stretch flange formability with a TS of 690 to 850 MPa and a λ of 40% or more, which has a chemical composition including, in percent by mass, 0.015% to 0.06% of C, less than 0.5% of Si, 0.1% to 2.5% of Mn, 0.10% or less of P, 0.01% or less of S, 0.005% to 0.3% of Al, 0.01% or less of N, 0.01% to 0.30% of Ti, 2 to 50 ppm of B, and the balance being Fe and incidental impurities, in which the relationships 0.75<(C %/12)/(Ti %/48)−N %/14−S %/32)<1.25 and 1.0<(Mn %+Bppm/10−Si %) are satisfied, the total area fraction of ferrite and bainitic ferrite phases is 90% or more, and the area fraction of cementite is 5% or less.

Japanese Unexamined Patent Application Publication No. 2002-322541 discloses a high tensile strength hot-rolled steel sheet having high formability and excellent uniformity of material with a TS of 610 to 830 MPa, which contains, in percent by mass, 0.1% or less of C, 0.05% to 0.6% of Mo, and 0.02% to 0.10% of Ti, in which carbides containing Ti and Mo in the range satisfying the atomic ratio Ti/Mo≥0.1 are dispersed and precipitated in the microstructure including a ferrite structure.

Furthermore, Japanese Unexamined Patent Application Publication No. 2009-185361 discloses a high strength hot-rolled steel sheet having excellent uniformity of strength with a small variation in strength with a TS of 540 to 780 MPa, which has a chemical composition including, in percent by mass, 0.05% to 0.12% of C, 0.5% or less of Si, 0.8% to 1.8% of Mn, 0.030% or less of P, 0.01% or less of S, 0.005% to 0.1% of Al, 0.01% or less of N, 0.030% to 0.080% of Ti, and the balance being Fe and incidental impurities, in which the area fraction of a polygonal ferrite phase is 70% or more, and the amount of Ti present in precipitates with a size of less than 20 nm is 50% or more of the value of Ti* calculated by the expression [Ti*=[Ti]−(48/14)×[N]].

However, in the high strength hot-rolled steel sheet described in Japanese Unexamined Patent Application Publication No. 2007-9322, hard ferrite and bainite phases are required to be produced at specified volume fractions. Since the transformation behavior is not constant with respect to the chemical composition of steel, there is a problem that controlling is difficult during air-cooling for promoting the ferrite transformation. In the high strength hot-rolled steel sheet described in each of Japanese Unexamined Patent Application Publication No. 2007-302992 and Japanese Unexamined Patent Application Publication No. 2002-322541, elongation El is low, and it is not necessarily possible to obtain a steel sheet having good stretch flangeability and material stability, which is a problem. In the high strength hot-rolled steel sheet described in Japanese Unexamined Patent Application Publication No. 2009-185361, a TS of 590 MPa or more is obtained by solid-solution strengthening using Mn. However, in solid-solution strengthening, the strengthening ratio relative to the amount of the element added is smaller than that in precipitation strengthening using Ti, and thus cost performance is poor. Furthermore, since the amount of C added is large relative to Ti, formation of hard cementite is unavoidable. Therefore, stretch flangeability is poor, which is also a problem.

It could therefore be helpful to provide a hot-rolled steel sheet having high strength and excellent ductility and stretch flangeability, and having good uniformity of material in which the variation in strength in a coil is small, and a method of manufacturing the same.

SUMMARY

We discovered:

1) Upon selecting a chemical composition for the purpose of controlling the precipitation efficiency of TiC and the cementite formation amount, by forming a steel microstructure in which the area fraction of the ferrite phase is 95% and the ferrite grain size is 10 μm or less, it is possible to obtain a hot-rolled steel sheet having a tensile strength (TS) of 590 to 780 MPa, a total elongation (El) of 28% or more, and a hole expanding ratio (λ) of 100% or more.

2) To improve uniformity of material, it is important to set the ferrite fraction at a certain level in the steel sheet and to suppress coarsening of TiC. Therefore, by setting the content of Mn, which is an austenite former, to 0.4% to 0.8%, which is in restrained condition, it becomes possible to complete the ferrite transformation in a short period of time, and the manufacturing cost can be reduced. To achieve a TS of 590 MPa or more, it is necessary to set the content of Ti to be 0.08% to 0.16%. However, when the content of Ti, which is a precipitate-forming element, is high, precipitates are likely to be coarsened, which is a problem. To solve this problem, it is important after obtaining precipitates during ferrite transformation to perform coiling at a low temperature. Specifically, the coiling temperature needs to be 560° C. or lower.

We thus provide:

[1] A high strength hot-rolled steel sheet having excellent ductility, stretch flangeability, and uniformity of material, characterized in that the steel sheet has a steel composition including, in percent by mass, 0.020% to 0.065% of C, 0.1% or less of Si, 0.40% to less than 0.80% of Mn, 0.030% or less of P, 0.005% or less of S, 0.08% to 0.20% of Ti, 0.005% to 0.1% of Al, 0.005% or less of N, and the balance being Fe and incidental impurities, in which Ti* specified by the expression (1) below satisfies the expressions (2) and (3) below, and the steel sheet has a steel microstructure including, in terms of area fraction, 95% or more of a ferrite phase and the balance being at least one of a pearlite phase, a bainite phase, and a martensite phase; the average ferrite grain size is 10 μm or less; the average grain size of Ti carbides precipitated in steel is 10 nm or less; and Ti in the amount of 80% or more of Ti* is precipitated as Ti carbides:

$$Ti^* = Ti - (48/14) \times N \quad (1)$$

$$Ti^* \geq 0.08 \quad (2)$$

$$0.300 \leq C/Ti^* \leq 0.375 \quad (3)$$

where Ti, N, and C represent contents of corresponding elements (percent by mass).

[2] A method of manufacturing a high strength hot-rolled steel sheet characterized by including heating a steel slab having the steel composition described in [1] at a temperature in a range of 1,200° C. to 1,300° C., then performing hot rolling at a finishing temperature of 900° C. or higher, starting cooling within 2 seconds after the hot rolling at a cooling rate of 30° C./s or more, stopping cooling at a temperature of 650° C. to 750° C., subsequently, after undergoing a natural cooling step for 5 to 20 seconds, performing cooling at a cooling rate of 30° C./s or more, and performing coiling in a coil shape at 560° C. or lower.

It is possible to manufacture a high strength hot-rolled steel sheet having high strength, excellent ductility and stretch flangeability, and good uniformity of material with a small variation in strength in the steel sheet, in which the tensile strength (TS) is 590 to 780 MPa or more, the total elongation (El) is 28% or more, the hole expanding ratio (λ) is 100% or more, and the variation in TS (ΔTS) is 15 MPa or less. The high strength hot-rolled steel sheet is suitable for use in structural members, such as pillars and members of automobiles, and frames of trucks.

DETAILED DESCRIPTION

Our steel sheet and methods will be described in detail below. Note that the unit expressing the content of each element is "percent by mass", and hereinafter, is simply described as "%".

1) Steel Composition

Reasons for limiting the steel composition (chemical composition) will be described.

C: 0.020% to 0.065%

C is an element that forms fine Ti carbides in the ferrite phase, thus contributing to an increase in strength. It is necessary to set the C content at 0.020% or more to obtain a hot-rolled steel sheet with a TS of 590 MPa or more. On the other hand, when the C content exceeds 0.065%, El and λ are degraded, and also the ferrite transformation speed becomes slow, resulting in degradation in uniformity of material. Therefore, the C content is 0.020% to 0.065%, preferably 0.020% to 0.055%, and more preferably 0.050% or less.

Si: 0.1% or less

When the Si content exceeds 0.1%, the $Ar_3$ point rises excessively, and thus it becomes difficult to obtain a fine and granular microstructure of the ferrite phase. Furthermore, the increase in the Si content leads to degradation in toughness and fatigue properties. Therefore, the Si content is 0.1% or less, and preferably 0.05% or less.

Mn: 0.40% to less than 0.80%

Mn is effective in increasing strength and refining ferrite grains. It is necessary to set the Mn content at 0.40% or more to obtain a hot-rolled steel sheet having a TS of 590 MPa or more and a ferrite grain size of 10 μm or less. On the other hand, when the Mn content is 0.80% or more, the ferrite transformation speed becomes slow, resulting in degradation in uniformity of material. Therefore, the Mn content is 0.40% to less than 0.80%.

P: 0.030% or less

When the P content exceeds 0.03%, segregation in the grain boundaries becomes marked, resulting in degradation in toughness and weldability. Therefore, the P content is 0.03% or less. Desirably, the P content is decreased as much as possible.

S: 0.005% or less

S forms sulfides with Mn and Ti to degrade stretch flangeability. Therefore, the S content is 0.005% or less. Desirably, the S content is decreased as much as possible.

Al: 0.005% to 0.1%

Al is utilized as a deoxidizing element and is an element effective for improving the steel cleanliness. It is necessary to set the Al content at 0.005% or more to obtain such an effect. On the other hand, an Al content of more than 0.1% is likely to cause surface defects and results in a rise in costs. Therefore, the Al content is 0.005% to 0.1%.

N: 0.005% or less

N is an element that has a strong affinity for Ti, and forms Ti nitrides which do not contribute to strengthening. Consequently, when the N content exceeds 0.005%, a large amount of Ti is required to secure the amount of Ti carbides which contribute to strengthening, which results in a rise in costs. Therefore, the N content is 0.005% or less. Desirably, the N content is decreased as much as possible.

Ti: 0.08% to 0.20%

Ti is an important element and precipitates as fine carbides, TiC and $Ti_4C_2S_2$, with a grain size of less than 10 nm in the ferrite phase during natural cooling (air cooling) subsequent to primary cooling after hot rolling, thus contributing to an increase in strength. The Ti content needs to be at least 0.08% or more to achieve a TS of 590 MPa or more. On the other hand, when the Ti content exceeds 0.20%, it is difficult to dissolve coarse Ti carbides during heating of the slab prior to hot rolling, and it is not possible to obtain fine Ti carbides which contribute to strengthening after hot rolling. Furthermore, during heating of the slab, non-uniform dissolution of Ti carbides is caused, which impairs uniformity of TS in the steel sheet. Therefore, the Ti content is 0.08% to 0.20%, preferably 0.08% to 0.16%, and more preferably 0.08% to 0.13%.

The balance is Fe and incidental impurities.

Expressions (1) to (3)

As will be described later, to obtain a hot-rolled steel sheet having a λ of 100% or more, it is necessary to control the amount of cementite precipitated. Therefore, we utilize the phenomenon that Ti binds to C to form Ti carbides such as TiC and $Ti_4C_2S_2$.

Consequently, it is necessary to secure the amount of Ti that can form Ti carbides, and Ti* defined by expression (1) below needs to satisfy expression (2) below.

$$Ti^* = Ti - (48/14) \times N \quad (1)$$

$$Ti^* \geq 0.08 \quad (2)$$

Ti* represents the amount of Ti that can form Ti carbides.

It is necessary to control the amount of cementite to obtain good stretch flangeability. In our steels, the amount of excess C that does not form Ti carbides corresponds to the amount of cementite formed. When the amount of cementite formed increases, stretch flangeability tends to degrade. The (C/Ti*) value needs to be 0.375 or less to obtain a λ of 100% or more. Furthermore, when this value is less than 0.300, the amount of fine Ti carbides formed is insufficient, and a predetermined strength (TS of 590 MPa or more) cannot be obtained.

That is, (C/Ti*) must satisfy expression (3):

$$0.300 \leq (C/Ti^*) \leq 0.375 \quad (3)$$

In expressions (1) to (3), Ti, N, and C represent contents of corresponding elements (percent by mass).

2) Steel Microstructure

The steel microstructure will be described below.

To achieve a TS of 590 to 780 MPa, an El of 28% or more, and a λ of 100% or more, it is essential to form a steel microstructure mainly composed of a hard ferrite phase. By precipitating Ti carbides in a highly ductile ferrite phase during ferrite transformation, it is possible to obtain a steel sheet having high strength and high ductility. It is necessary to fix C contained as fine Ti carbides to suppress precipitation of cementite which adversely affects stretch flangeability. Since cementite is very hard, it serves as an origin to generate voids during blanking and during stretch flange forming. Generated voids grow and link together, which leads to fracture. However, in the steel sheet having a steel microstructure in which the area fraction of the ferrite phase is 95% or more, since the spacing between cementite grains is sufficiently large, development of linkage of voids can be slowed down even if cementite is contained, and stretch flangeability is satisfactory compared with the case where the area fraction of ferrite is less than 95%. Furthermore, when the area fraction of the ferrite phase is 95% or more, it is possible to achieve an El of 28% or more.

As long as the area fraction of the ferrite phase is 95% or more, even if at least one of a martensite phase, a bainite phase, and a pearlite phase is contained as a secondary phase, the advantages of the present invention is not impaired.

To obtain a steel sheet having high strength and uniformity of material, in addition to satisfying the condition that the area fraction of the ferrite phase is 95% or more, it is necessary to set the ferrite grain size and the size of Ti carbides to be fine and uniform. Furthermore, it is necessary to obtain as many Ti carbides as possible. Specifically, as long as the average ferrite grain size is 10 μm or less, the average grain size of Ti carbides is 10 nm or less, and Ti in the amount of 80% or more of Ti* (the amount of Ti that can form Ti carbides) is precipitated as Ti carbides, it is possible to achieve a TS of 590 MPa or more and a ΔTS of 15 MPa or less.

3) Manufacturing Conditions

The manufacturing conditions will be described.

Slab heating temperature: 1,200° C. to 1,300° C.

It is necessary, before hot rolling, to dissolve coarse Ti carbides precipitated in the slab to precipitate fine Ti carbides in the ferrite phase after hot rolling. For that purpose, the slab needs to be heated at 1,200° C. or higher. On the other hand, heating at higher than 1,300° C. increases the amount of scales formed, resulting in a decrease in yield. Therefore, the slab heating temperature is 1,200° C. to 1,300° C.

Hot rolling finishing temperature: 900° C. or higher

Since the content of Mn, which is an austenite former, is low, the $Ar_3$ point is relatively high. Specifically, a finishing temperature of lower than 900° C. causes coarsening of ferrite grains and an abnormal microstructure, resulting in a decrease in strength and uniformity of material. Therefore, the finishing temperature is 900° C. or higher.

Cooling start time after hot rolling: within 2 seconds

Average cooling rate during primary cooling after hot rolling: 30° C./s or more

When the time until the start of primary cooling after hot rolling exceeds 2 seconds, coarse ferrite grains and coarse Ti carbides are formed, resulting in a decrease in strength and uniformity of material. Therefore, the cooling start time after hot rolling is within 2 seconds. For the same reason, the average cooling rate during primary cooling after hot rolling is 30° C./s or more.

Primary cooling stop temperature: 650° C. to 750° C.

By stopping primary cooling at a temperature of 650° C. to 750° C., it is necessary to promote ferrite transformation and formation of fine Ti carbides during subsequent natural cooling (air cooling). When the cooling stop temperature is lower than 650° C., ferrite is not formed sufficiently, an area fraction of 95% or more cannot be secured, and it is not possible to precipitate Ti in the amount of 80% or more of Ti* as Ti carbides. On the other hand, when the cooling stop temperature exceeds 750° C., ferrite grains and Ti carbides are coarsened, and it is difficult to achieve a ferrite grain size of 10 μm or less and an average grain size of Ti carbides of 10 nm or less. Therefore, the primary cooling stop temperature is 650° C. to 750° C.

Air cooling time after primary cooling: 5 to 20 seconds

When the air cooling time is less than 5 seconds, the ferrite phase is not formed sufficiently, and it is difficult to achieve an area fraction of the ferrite phase of 95% or more and to precipitate Ti in the amount of 80% or more of Ti* as Ti carbides. When the air cooling time exceeds 20 seconds, ferrite grains and Ti carbides are coarsened, and it is difficult to achieve a ferrite grain size of 10 μm or less and an average grain size of Ti carbides of 10 nm or less. Therefore, the air cooling time after primary cooling is 5 to 20 seconds.

Secondary cooling condition: average cooling rate 30° C./s or more

To maintain a ferrite grain size of 10 μm or less and an average grain size of Ti carbides of 10 nm or less obtained by combination of primary cooling after hot rolling and the air cooling step, it is necessary to perform secondary cooling at an average cooling rate of 30° C./s or more after the air cooling until coiling.

Coiling temperature: 560° C. or lower

In the manufacturing method, the microstructure of the steel sheet and the state of Ti carbides are determined before coiling, and then a coiling process is performed. However, when the coiling temperature exceeds 560° C., Ti carbides are coarsened, and strength is decreased. Therefore, the coiling temperature is 560° C. or lower. From the viewpoint of securing good steel sheet shape, the coiling temperature is preferably 350° C. or higher.

Regarding other manufacturing conditions, usual conditions may be used. For example, steel having a desired chemical composition is produced by refining in a converter, electric furnace, or the like, and then secondary refining in a vacuum degassing furnace. Subsequent casting is desirably performed by a continuous casting process from the viewpoint of productivity and quality. After casting, hot rolling is performed in accordance with the method of the present invention. After hot rolling, the properties of the steel sheet are not impaired even in the state in which scales are attached to the surface or in the state in which scales are removed by pickling. Furthermore, after hot rolling, it is also possible to perform temper rolling, hot dip zinc-based plating, electrogalvanizing, or chemical conversion treatment. The term "zinc-based plating" refers to plating using zinc or zinc as a main component (at a zinc content of 90% or more), for example, plating containing an alloying element, such as Al or Cr, in addition to zinc, or plating in which alloying treatment is performed after zinc-based plating is performed.

Examples

Steels A to H having the chemical compositions (compositions) shown in Table 1 were refined by a converter, and slabs were formed by a continuous casting process. The resulting steel slabs were heated at 1,250° C., and coil-shaped, hot-rolled steel sheet Nos. 1 to 18 with a thickness 3.2 mm were produced under the hot rolling conditions shown in Table 2.

Note that, in Tables 1 and 2, underlines indicate that values are outside our ranges.

TABLE 1

| Steel symbol | Chemical composition (mass %) | | | | | | | | | | Remarks |
|---|---|---|---|---|---|---|---|---|---|---|---|
| | C | Si | Mn | P | S | Al | N | Ti | Ti* | C/Ti* | |
| A | 0.041 | 0.03 | 0.61 | 0.017 | 0.002 | 0.039 | 0.0012 | 0.120 | 0.116 | 0.354 | Within our range |
| B | 0.025 | 0.02 | 0.43 | 0.015 | 0.002 | 0.041 | 0.0012 | 0.086 | 0.082 | 0.305 | Within our range |
| C | 0.062 | 0.02 | 0.78 | 0.016 | 0.002 | 0.042 | 0.0009 | 0.169 | 0.166 | 0.374 | Within our range |
| D | 0.019 | 0.01 | 0.43 | 0.017 | 0.002 | 0.041 | 0.0025 | 0.110 | 0.102 | 0.187 | Outside our range |
| E | 0.077 | 0.02 | 0.64 | 0.015 | 0.002 | 0.040 | 0.0025 | 0.104 | 0.096 | 0.806 | Outside our range |
| F | 0.033 | 0.56 | 0.63 | 0.015 | 0.002 | 0.045 | 0.0035 | 0.108 | 0.096 | 0.343 | Outside our range |
| G | 0.038 | 0.02 | 1.25 | 0.018 | 0.002 | 0.045 | 0.0021 | 0.112 | 0.105 | 0.362 | Outside our range |
| H | 0.036 | 0.02 | 0.66 | 0.016 | 0.002 | 0.041 | 0.0045 | 0.075 | 0.060 | 0.603 | Outside our range |

TABLE 2

| Hot-rolled steel sheet No. | Steel symbol | Finishing temperature ° C. | Primary cooling | | | Air cooling Time s | Secondary cooling Average cooling rate ° C./s | Coiling temperature ° C. | Remarks |
|---|---|---|---|---|---|---|---|---|---|
| | | | Cooling start time after rolling s | Average cooling rate ° C./s | Cooling stop temperature ° C. | | | | |
| 1 | A | 920 | 1.5 | 110 | 700 | 10 | 50 | 500 | Example |
| 2 | | 910 | 1.5 | 110 | 650 | 15 | 60 | 500 | Example |
| 3 | | 910 | 1.5 | 110 | 750 | 7 | 60 | 400 | Example |
| 4 | | 910 | 3.0 | 110 | 700 | 10 | 55 | 500 | Comparative example |
| 5 | | 920 | 1.5 | 20 | 700 | 10 | 50 | 500 | Comparative example |
| 6 | | 920 | 1.5 | 110 | 600 | 20 | 50 | 500 | Comparative example |
| 7 | | 920 | 1.5 | 110 | 800 | 10 | 55 | 450 | Comparative example |
| 8 | | 910 | 1.5 | 110 | 700 | 25 | 60 | 550 | Comparative example |
| 9 | | 910 | 1.5 | 110 | 700 | 10 | 20 | 500 | Comparative example |
| 10 | | 920 | 1.5 | 110 | 700 | 10 | 55 | 600 | Comparative example |
| 11 | B | 910 | 1.5 | 110 | 700 | 10 | 50 | 500 | Example |
| 12 | | 880 | 1.5 | 110 | 700 | 10 | 50 | 500 | Comparative example |
| 13 | C | 920 | 1.5 | 110 | 700 | 10 | 50 | 500 | Example |
| 14 | D | 910 | 1.5 | 110 | 700 | 10 | 50 | 500 | Comparative example |
| 15 | E | 920 | 1.5 | 110 | 700 | 10 | 55 | 500 | Comparative example |
| 16 | F | 920 | 1.5 | 110 | 700 | 10 | 60 | 500 | Comparative example |

TABLE 2-continued

| | | | Primary cooling | | | | Secondary | | |
| --- | --- | --- | --- | --- | --- | --- | --- | --- | --- |
| Hot-rolled steel sheet No. | Steel symbol | Finishing temperature °C. | Cooling start time after rolling s | Average cooling rate °C./s | Cooling stop temperature °C. | Air cooling Time s | cooling Average cooling rate °C./s | Coiling temperature °C. | Remarks |
| 17 | G | 910 | 1.5 | 110 | 700 | 10 | 50 | 500 | Comparative example |
| 18 | H | 920 | 1.5 | 110 | 700 | 10 | 55 | 500 | Comparative example |

In each of the coils, which had been pickled, after trimming innermost and outermost turns and both ends in the coil width direction by 10 mm, the coil was divided into 20 equal portions in the longitudinal direction of the coil and into 8 equal portions in the width direction. JIS No. 5 tensile test specimens were taken, in a direction parallel to the rolling direction, from 189 positions including trimmed coil ends. A tensile test was carried out in accordance with JIS Z 2241, at a cross head speed of 10 mm/min. The average tensile strength (TS) and total elongation (El), and, as a measure of uniformity of material, the variation in TS in the trimmed coil, i.e., the standard deviation of TS (ΔTS) were obtained.

Furthermore, hole expanding test specimens were taken from 189 positions, and a hole expanding test was carried out in accordance with The Japan Iron and Steel Federation standard JFST1001. Thus, the average hole expanding ratio λ was obtained. Regarding the area fractions of the ferrite phase and the secondary phase in the entire microstructure, test specimens for a scanning electron microscope (SEM) were taken from 189 positions. A cross section in the thickness direction parallel to the rolling direction of each test specimen was polished and then etched with nital. SEM photographs were taken at a magnification of 1,000 times for 10 viewing fields in the vicinity of the central part in the thickness direction. The ferrite phase and phases other than the ferrite phase, such as the martensite phase, were identified by image processing. The areas of the ferrite phase and phases other than the ferrite phase, such as the martensite phase, were measured by image analysis, and the proportion (percentage) in the area of the viewing field was obtained. The area fraction of the ferrite phase was defined by the lowest value in 189 points.

The average ferrite grain size was determined by the intercept method from the 10 viewing fields of the SEM photographs. That is, three vertical lines and three horizontal lines were drawn in each SEM photograph, and the ferrite grain intercept length was obtained. The value obtained by multiplying the resulting grain intercept length by 1.13 (corresponding to the nominal grain size according to ASTM) was defined as the ferrite grain size, and the average ferrite grain size was obtained by averaging the grain sizes in the 10 viewing fields.

The maximum value of the average ferrite grain sizes obtained in the 189 positions is shown in Table 3 below. Regarding the average grain size of Ti carbides, thin films were taken by the twin jet method from 21 positions, i.e., 20 equal portions divided in the longitudinal direction of the coil including coil ends, in the central part in the coil width direction and in the central part in the thickness direction. Observation was performed using a transmission electron microscope (TEM). The grain sizes of 3,000 or more Ti carbide grains were measured by image analysis, and the average value was obtained. Regarding the amount of Ti carbides precipitated, for the 21 positions from which specimens for TEM observation were taken, about 0.2 g was subjected to constant-current electrolysis in a 10% AA-based electrolyte solution (10 vol % acetyl acetone—1 mass % tetramethylammonium chloride-methanol) at a current density of 20 mA/cm$^2$, to extract Ti carbides. By analyzing the extracted amount, the amount of Ti carbides precipitated was determined.

The results are shown in Table 3. Underlines in the table indicate that values are outside our ranges.

In Table 3, Steel sheet Nos. 1 to 3, 11, and 13 are examples, and Steel sheet Nos. 4 to 10, 12, and 14 to 18 are comparative examples.

The ferrite area fraction is shown in Table 3. Note that the phase other than ferrite was a pearlite or bainite phase.

TABLE 3

| Hot-rolled steel sheet No. | Mechanical properties | | | | Microstructure | | | | Remarks |
| --- | --- | --- | --- | --- | --- | --- | --- | --- | --- |
| | TS MPa | ΔTS MPa | El % | λ % | Ferrite area fraction % | Ferrite grain size μm | Average grain size of Ti carbides nm | Ratio of amount of Ti carbides precipitated to amount of Ti* % | |
| 1 | 698 | 7 | 30 | 112 | 97 | 7 | 6 | 86 | Example |
| 2 | 677 | 12 | 29 | 107 | 98 | 7 | 5 | 81 | Example |
| 3 | 613 | 11 | 31 | 116 | 98 | 10 | 9 | 96 | Example |
| 4 | <u>586</u> | <u>28</u> | 29 | 109 | 96 | <u>11</u> | 8 | 97 | Comparative example |
| 5 | <u>565</u> | <u>31</u> | 31 | 111 | 98 | <u>12</u> | 9 | 94 | Comparative example |
| 6 | 621 | <u>35</u> | <u>26</u> | <u>78</u> | <u>76</u> | 6 | 6 | <u>76</u> | Comparative example |

TABLE 3-continued

| | Mechanical properties | | | | Microstructure | | | | |
|---|---|---|---|---|---|---|---|---|---|
| Hot-rolled steel sheet No. | TS MPa | ΔTS MPa | El % | λ % | Ferrite area fraction % | Ferrite grain size μm | Average grain size of Ti carbides nm | Ratio of amount of Ti carbides precipitated to amount of Ti* % | Remarks |
| 7 | <u>532</u> | <u>47</u> | <u>27</u> | <u>64</u> | <u>61</u> | 9 | <u>12</u> | 64 | Comparative example |
| 8 | <u>578</u> | <u>21</u> | 29 | 104 | 98 | 9 | <u>11</u> | 93 | Comparative example |
| 9 | <u>574</u> | <u>27</u> | 29 | 107 | 96 | <u>13</u> | 7 | 94 | Comparative example |
| 10 | <u>564</u> | <u>22</u> | 31 | 108 | 97 | <u>11</u> | <u>11</u> | 98 | Comparative example |
| 11 | 602 | 8 | 31 | 118 | 96 | 8 | 7 | 89 | Example |
| 12 | <u>578</u> | <u>19</u> | 31 | 105 | 97 | <u>11</u> | 7 | <u>79</u> | Comparative example |
| 13 | 773 | 14 | 28 | 103 | 97 | 7 | 6 | 87 | Example |
| 14 | <u>549</u> | 11 | 28 | 121 | 99 | 8 | 4 | <u>59</u> | Comparative example |
| 15 | 688 | 10 | 29 | <u>67</u> | 82 | 7 | 7 | 88 | Comparative example |
| 16 | 595 | <u>25</u> | 32 | 101 | 98 | <u>11</u> | 7 | <u>77</u> | Comparative example |
| 17 | 702 | <u>18</u> | <u>26</u> | <u>86</u> | <u>76</u> | 6 | 6 | <u>71</u> | Comparative example |
| 18 | <u>574</u> | 13 | 30 | 113 | <u>83</u> | 7 | 6 | 94 | Comparative example |

In each of Nos. 1 to 3, 11, and 13, which are our examples, TS is 590 to 780 MPa, El is 28% or more, λ is 100% or more, thus exhibiting high strength and excellent ductility and stretch flangeability, and the variation in TS (ΔTS) is 15 MPa or less, showing a small variation in strength in the coil and excellent uniformity of material.

On the other hand, in No. 4, which is a comparative example, although the steel type is A and the composition is within our range, the primary cooling start time after rolling is 3.0 seconds, which exceeds 2 seconds, and thus the manufacturing condition is outside our range. For this reason, the ferrite grain size is 11 μm, showing coarsening, TS is 586 MPa, exhibiting low strength, and ΔTS is 28 MPa, showing poor uniformity of material.

In No. 5, which is a comparative example, although the steel type is A and the composition is within our range, the average cooling rate during primary cooling after rolling is 20° C./s, which is less than 30° C./s, and thus the manufacturing condition is outside our range. For this reason, as in No. 4, the ferrite grain size is 12 μm, showing coarsening, TS is 565 MPa, showing low strength, and ΔTS is 31 MPa, showing poor uniformity of material.

In No. 6, which is a comparative example, although the steel type is A and the composition is within our range, the cooling stop temperature in primary cooling after rolling is 600° C., which is lower than 650° C., and thus the manufacturing condition is outside our range. For this reason, the ferrite phase is not sufficiently formed, the ferrite area fraction is low at 76%, the amount of Ti carbides precipitated is 76% of Ti*, which is short of 80%, El is slightly low at 26%, λ is slightly low at 78%, and in particular, ΔTS is 35 MPa, showing poor uniformity of material.

Furthermore, in No. 7, which is a comparative example, although the steel type is A and the composition is within our range, the cooling stop temperature in primary cooling after rolling is 800° C., which is higher than 750° C., and thus the manufacturing condition is outside our range. For this reason, the average grain size of Ti carbides is 12 nm, which exceeds 10 nm, and the amount of Ti precipitated is 64% of Ti*, which is less than 80%. Furthermore, the ferrite area fraction is 61%, which is less than 85%. Consequently, TS is low at 532 MPa, and ΔTS reaches 47 MPa, thus showing low strength and poor uniformity of material. Furthermore, El is 27% and λ is 64%, thus showing poor ductility and stretch flangeability.

In No. 8, which is a comparative example, although the steel type is A and the composition is within our range, the air cooling time after primary cooling is 25 seconds, which exceeds 20 seconds, and thus the manufacturing condition is outside our range. For this reason, the average grain size of Ti carbides is 11 nm, showing coarsening. Consequently, TS is 578 MPa, and ΔTS is 21 MPa, showing slightly poor strength and uniformity of material.

In No. 9, which is a comparative example, although the steel type is A, which is within our range, the average cooling rate in secondary cooling is 20° C./s, which is lower than 25° C./s, deviating from our manufacturing conditions. For this reason, the ferrite grain size is 13 μm, showing coarsening. Consequently, TS is 574 MPa, and ΔTS is 27 MPa, showing slightly poor strength and uniformity of material.

In No. 10, which is a comparative example, although the steel type is A, which is within our range, the coiling temperature is 600° C., which is higher than 560° C., deviating from our manufacturing conditions. The average grain size of Ti carbides and the ferrite grain size exceed 10 nm and 10 μm, respectively, showing coarsening. Consequently, TS is 564 MPa, and ΔTS is 22 MPa, showing slightly poor strength and uniformity of material.

In each of No. 11, which is our example, and No. 12, which is a comparative example, the steel type is B, and the composition is within our range. In No. 11, which is our example, the hot rolling finishing temperature is 910° C., satisfying our manufacturing conditions. In contrast, in No. 12, which is a comparative example, the hot rolling finishing temperature is 880° C., deviating from our manufacturing conditions. For this reason, in comparative example 12, the ferrite grain size is 11 μm, showing coarsening, resulting in poor strength and uniformity of material.

In No. 14, which is a comparative example, the steel type is D, in which the C content is 0.019% and the (C/Ti*) value is 0.187, and the composition deviates from our conditions. For this reason, TS is 549 MPa, showing low strength.

In No. 15, which is a comparative example, the steel type is E, in which the C content is 0.077% and the (C/Ti*) value is 0.806, and the composition deviates from our conditions. For this reason, λ is 67%, showing poor formability.

In No. 16, which is a comparative example, the steel type is F, in which the Si content is 0.56%, and the composition deviates from our conditions (0.1% or less). For this reason, the ferrite grain size is 11 μm, exceeding 10 μm, and ΔTS is 25 MPa, showing poor uniformity of material.

In No. 17, which is a comparative example, the steel type is G, in which the Mn content is 1.25%, and the composition deviates from our conditions (less than 0.80%). Furthermore, the ratio of the amount of Ti carbides precipitated to the amount of Ti* is low at 0.71, falling below our conditions. For this reason, the ferrite area fraction is low, ΔTS is 18 MPa, showing poor uniformity of material, El is 26%, and λ is 86%, showing poor ductility and stretch flangeability.

In No. 18, which is a comparative example, the steel type is H, in which the Ti content is 0.075%, and the composition deviates from our conditions (0.08% to 0.16%). Furthermore, Ti* is 0.060, which is less than 0.08, and (C/Ti*) is 0.603, which is more than 0.375, both of which deviate from our conditions. For this reason, TS is 574 MPa, showing poor strength.

As described above, it is possible to obtain a hot-rolled steel sheet having a TS of 590 to 780 MPa, an El of 28% or more, a λ of 100% or more, and a ΔTS of 15 MPa or less, thus having excellent ductility (elongation property) and stretch flangeability and excellent uniformity of material.

The invention claimed is:

1. A high strength hot-rolled steel sheet having excellent ductility, stretch flangeability, and uniformity of material, the steel sheet having a steel composition comprising:

in percent by mass,
0.020% to 0.065% of C;
0.1% or less of Si;
0.40% to less than 0.80% of Mn;
0.030% or less of P;
0.005% or less of S;
0.104% to 0.20% of Ti;
0.005% to 0.1% of Al;
0.005% or less of N; and
the balance being Fe and incidental impurities, in which Ti* specified by expression (1) below satisfies expressions (2) and (3) below, and the steel sheet has a steel microstructure including, in terms of area fraction, 95% or more of a ferrite phase and the balance being at least one of a pearlite phase, a bainite phase, and a martensite phase; the average ferrite grain size is 10 μm or less; the average grain size of Ti carbides precipitated in steel is 10 nm or less; and Ti in an amount of 80% or more of Ti* is precipitated as Ti carbides:

$$Ti^* = Ti - (48/14) \times N \quad (1)$$

$$Ti^* \geq 0.08 \quad (2)$$

$$0.300 \leq C/Ti^* \leq 0.375 \quad (3)$$

where Ti, N, and C represent contents of corresponding elements (percent by mass).

2. A method of manufacturing a high strength hot-rolled steel sheet comprising:

heating a steel slab having the steel composition according to claim 1 at a temperature in a range of 1,200° C. to 1,300 ° C.;
performing hot rolling at a finishing temperature of 900 ° C. or higher; starting cooling within 2 seconds after the hot rolling at a cooling rate of 30° C/s or more;
stopping the cooling at a temperature of 650° C. to 750° C.;
subsequently, after undergoing a natural cooling step for 5 to 20 seconds, performing cooling at a cooling rate of 30° C/s or more; and
performing coiling in a coil shape at 560° C. or lower.

* * * * *